Patented Aug. 10, 1948

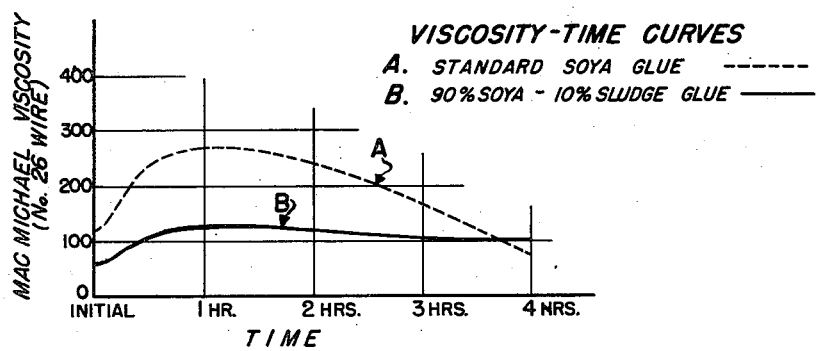
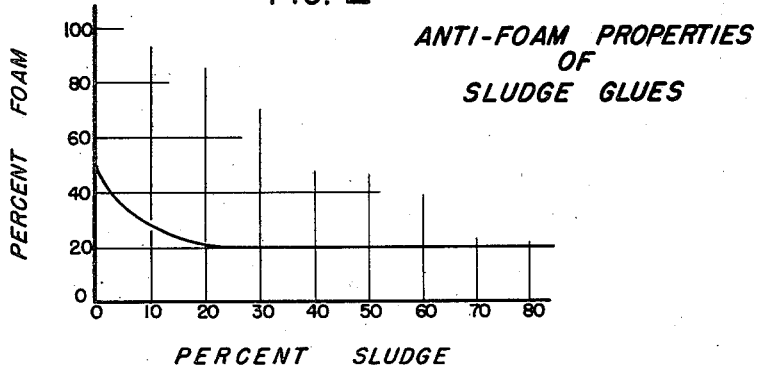
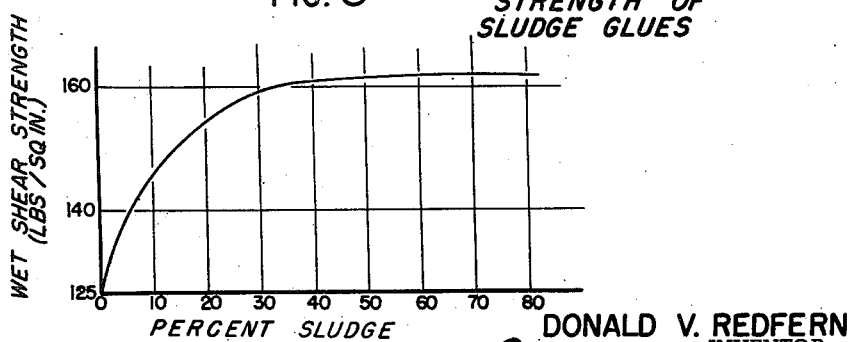
DONALD V. REDFERN
INVENTOR

2,446,954

UNITED STATES PATENT OFFICE 2,446,954

SOYA MEAL-SEWAGE SLUDGE ADHESIVE

Donald V. Redfern, Seattle, Wash., assignor to Adhesive Products Company, Seattle, Wash.

Application October 9, 1943, Serial No. 505,641

2 Claims. (Cl. 106—154)

The present invention relates to an adhesive and in more particular to a protein adhesive derived from sewage sludge.

Three of the characteristics of a protein glue by which its desirability is evaluated are those of viscosity and breakdown with respect to time; water resistance and holding power; and foam value. Any adhesive which can better any or all of these factors without a deterioration of another factor is a more worthwhile product. This is especially true if the betterment can be made with a reduction in cost. A further feature, one not easily evaluated but which in the glue field is often of primary importance, is that of uniformity of product from one batch, or time, to another. The adhesive forming the the subject matter of the present invention is improved in all of the above mentioned characteristics. In fact, no reduction in any desirable factor is known with respect to the present product as compared with the prior art protein adhesives.

Having in mind these attributes of an adhesive, it is an object of the present invention to produce an adhesive that excels other protein adhesives in the several or collective factors of viscosity and breakdown with respect to time; water resistance and holding power; foam value; uniformity; and cost.

Applicant has found a new source of protein which is cheaper and better than the proteins heretofore used. This protein comes from sewage sludge.

A sewage sludge comprises the solids precipitated from sewage. A well known form of sludge and one suitable for use in adhesive compositions is known as activated sludge and is the end product of an aeration process of treating sewage. The character of this sludge is given in "American Sewerage Practice," vol. III, 3rd ed., 1935, by Metcalf and Eddy, published by McGraw-Hill Co., at page 673. On a dry basis, the sludge has about the following: volatile solids 65%, total nitrogen as N 5%, phosphates as $P_2O_5$, 2.40%, and potash as $K_2O$, 0.3%. It is believed that a suitable product results from either aerobic or anaerobic action on sewage and for practical purposes should be free of objectionable odors and in a sterile condition. There are various other end products of bacterial action, such as in the brewing and distilling industries, that will produce a comparable sludge which for the present purposes may be termed a "sewage sludge."

One of the distinguishing characteristics of such sludges is its high protein content. The exact chemical composition of these proteins that make them more desirable for use as glues is not known but the distinguishing features of the final adhesive product containing such sludges are very marked.

Those adhesives containing sludge do, for example, differ from the soya adhesives by their more uniform viscosity with respect to time, and by their lower rate of breakdown; by their greater water resistance and holding power; and by their lower foam value. All of these factors of comparison are standard and well known methods in the art for evaluating adhesives, and in all of these factors the present adhesives markedly excel over other protein adhesives.

A graphic presentation of these factors of comparison is shown in the accompanying drawings, in which:

Figure 1 is a graph of glue viscosity against time for a standard soya glue and for a glue containing sludge.

Figure 2 is a graph of percent foam against percent sludge in a glue.

Figure 3 is a graph of percent sludge in a glue against wet strength.

The present glue may be made by mixing together in a standard way the ingredients used in a standard soya or other protein glue with the exception that all or a portion of the protein should be supplied by using sludge. Such standard glues are illustrated by Fawthrop 2,292,624 (Cl. 106–161), Laucks 1,689,732, and Johnson Re. 16,422.

It is also to be recognized that glues may be made by using undried sewage sludge. This is particularly true where as with the present product, the rate of breakdown is so slow.

In the following discussion, where reference is made to the percentage of sludge in an adhesive, the percent figure is based on the dry weight of the ingredients.

The graph of Figure 1 is that of viscosity against time. This is equivalent to breakdown against time as viscosity and breakdown are directly related. The great improvement due to the use of even small quantities of sludge may be perceived by a comparison of the curves A and B. The sludge acts not only to reduce the viscosity but to stabilize the product. The stabilization is a decrease of the rate of breakdown of the protein to give off ammonia. This quality allows the use of a batch of glue over a long period of time, a very desirable attribute in the plywood industry.

If a family of curves were made up for a glue to show the change in viscosity for different percentages of sludge, it would be found that as the percentage of sludge increased the viscosity curves would become flatter until in the region of thirty percent sludge further improvement would become negligible.

Figure 2 shows the foam character of a glue containing various quantities of sludge. Copious foaming prevents the use of the glue in spreading machines, reduces the bond, and generally gives an inferior product. The foam value may be measured by any standard test or by other means but the results will be comparable to those shown in the figure.

A further characteristic of sludge glue is shown in Figure 3 wherein there is graphed the percent sludge in a glue against wet holding power. Wet holding power is a direct function of water resistance. This distinctive feature of a glue when wet is generally of utmost importance, and as may be seen from the graph, glues made with sludge are superior glues by a comfortable margin.

Another peculiarity that should receive consideration is the uniformity of the present glues. If a given formula and procedure will not give an equivalent or identical product from time to time, such is not desirable. Such conditions are usually due to variations in the form of the protein. These variations in the original ingredient are hard to determine beforehand, and usually show up only in the final product. Small additions of sludge have a marked effect in obtaining uniformity. It may be inferred that the farther decomposition of organic matter is carried on, the more uniform the end product.

A vital factor is that of cost. At the present time, dry sewage sludge is much cheaper than soya meal as a basic material.

While the above graphs have been illustrative in each instance of a particular glue mix with varying quantities of sludge, it is to be realized that the basic mix may be varied. That is, the process of mixing and the ingredients used may be as shown in various prior art references, such as those cited above, with the substitution for the proteins disclosed of various quantities of sludge. These adhesives when made with sludge will differ from the original, but, it is believed, that in all instances the sludge will increase the desirability of the adhesive, and that this increase will be of the order of that illustrated by the graphs of the drawing. However, in substituting sludge for other proteins in standard formulae, the resulting glue will not be of the same quality as is evident from the graphs and this specification. Such a resulting adhesive may need modification to obtain a glue having the correct features. This is particularly true with respect to viscosity, as is evident from Figure 1. Such changes as are required to obtain needed characteristics are usual in the art, and apply to all adhesives.

As a particular example of the composition and process of compounding an adhesive using sludge, the following is given:

| | Pounds |
|---|---|
| Activated sludge (Milorganite ground to pass 90% thru 200 mesh) | 10 |
| Soya meal | 84.15 |
| Sodium fluoride | 4.95 |
| Pine oil | 0.9 |

Mix thoroughly.

| | |
|---|---|
| Water at 60° F | 200 |
| Mix 4 minutes and add: | |
| Water | 90 |
| Mix 2 minutes and add: | |
| Caustic soda in 12 lbs. of water | 6 |
| Mix 3 minutes and add: | |
| Lime in 29 lbs. of water | 14½ |
| Mix 5 minutes and add: | |
| Sodium silicate | 25 |
| Mix 2 minutes and add: | |
| Carbon bisulfide | 1.5 |
| Carbon tetrachloride | 1.0 |
| Mix 2 minutes and add: | |
| Pine oil | 1.0 |
| Mix 2 minutes and finish. | |

The above mixture will give an adhesive that will have the characteristics of viscosity shown by curve B of Figure 1. This curve shows the results of adding even small quantities of sludge.

As a further example, using larger amounts of sludge, the following is given:

| | Parts |
|---|---|
| Mix dry by weight: | |
| Milorganite (90% thru 200 mesh) | 33 |
| Ground soya meal | 67 |
| Copper sulfate | 2 |
| Add to suitable mixer. | |
| Dry mix | 100 |
| Water | 333 |
| Mix 5 minutes. | |
| Lime in 15 parts of water | 9 |
| Mix 3 minutes. | |
| Caustic soda in 15 parts of water | 9 |
| Mix 3 minutes. | |
| "N" grade sodium silicate | 25 |
| Mix 3 minutes. | |
| Mix of carbon disulfide-carbon tetrachloride | 2 |
| Mix 2 minutes. | |

This glue was spread on plywood panels and pressed cold, allowed to stand in clamps at 150 pounds per square inch overnight, and then stood for 5 days before testing, according to Douglas fir plywood specifications set forth in Bulletin C. S. 45-40 of U. S. Dept. of Commerce. Panels were 5 ply, 1/10" face, center, and core.

The wet breaks as defined, were:

| Panel # | Pounds Sq. In. | Per Cent Wood Failure |
|---|---|---|
| 2 | 168 | 15 |
| 4 | 165 | 17 |
| Avg | 167 | 16 |

The McMichel viscosity with a No. 26 wire was:

| Initial | 1 hr. | 2 hrs. | 3 hrs. |
|---|---|---|---|
| 58 | 88 | 98 | 104 |

While the present disclosure is illustrative of the use of sludge in adhesives or glues, it is well recognized in the art that proteins are useful in the whole plastic field. That is, not only is this protein useful in the adhesive field but also in the molded organic plastics field, commonly called "plastics." In this latter field its use is mainly as a binder or adhesive. The term "adhesive" is believed to cover this use as well as the more narrow common one of "glue." The use of sludge as a substitute for, or in combination with, the prior art proteins in plastics has been found to be very beneficial for much the same reasons as its use in an adhesive.

Having thus described my invention, I claim:

1. A proteinaceous adhesive consisting essentially of soya meal, undigested activated sewage sludge, and an alkali metal hydroxide in an aqueous medium; said sludge being present in sufficient amount to give a more uniform viscosity with respect to time, a lower rate of break down, a greater water resistance and holding power, and a lower foam value.

2. A proteinaceous adhesive consisting essentially of soya meal, undigested activated sewage sludge, and an alkali metal hydroxide in an aqueous medium; and which sludge is at least 30% of the combined weight of said meal and sludge.

DONALD V. REDFERN.

REFERENCES CITED

The following references are of record in the file of this patent:

UNITED STATES PATENTS

| Number | Name | Date |
|---|---|---|
| 2,297,340 | Wood | Sept. 29, 1942 |
| 2,292,624 | Fawthrop | Aug. 11, 1942 |
| 1,999,973 | Genter | Apr. 30, 1935 |
| 1,980,896 | Windecker | Nov. 13, 1934 |
| 1,980,244 | Wright | Nov. 13, 1934 |
| 1,811,181 | Maltby | June 23, 1931 |
| 1,689,732 | Laucks et al. | Oct. 30, 1928 |
| Re. 16,422 | Johnson | Sept. 14, 1926 |

FOREIGN PATENTS

| Number | Country | Date |
|---|---|---|
| 356 | Great Britain | 1900 |

OTHER REFERENCES

Metcalf and Eddy: American Sewerage Practice, vol. III, Disposal of Sewage, 3rd ed., 1935; pages 11 and 672.